United States Patent
Yaginuma

(10) Patent No.: US 11,301,647 B2
(45) Date of Patent: Apr. 12, 2022

(54) WIRELESS TAG READER APPARATUS AND WIRELESS TAG READING METHOD

(71) Applicant: TOSHIBA TEC KABUSHIKI KAISHA, Tokyo (JP)

(72) Inventor: Jun Yaginuma, Izunokuni Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/013,550

(22) Filed: Sep. 5, 2020

(65) Prior Publication Data

US 2021/0081620 A1    Mar. 18, 2021

(30) Foreign Application Priority Data

Sep. 13, 2019 (JP) .............................. JP2019-166853

(51) Int. Cl.
*G06K 7/10* (2006.01)
*H01Q 1/22* (2006.01)

(52) U.S. Cl.
CPC ..... *G06K 7/10099* (2013.01); *G06K 7/10029* (2013.01); *G06K 7/10356* (2013.01); *G06K 7/10435* (2013.01); *H01Q 1/2208* (2013.01)

(58) Field of Classification Search
CPC ........... G06K 7/10099; G06K 7/10029; G06K 7/10435; G06K 7/10356; G06K 7/10376; H01Q 1/2208; H01Q 1/2216; H01Q 3/02; H01Q 3/04; H01Q 3/06; H01Q 3/08; G01S 1/38; G01S 11/026; G01S 11/04; G07G 1/009; G06Q 20/18
USPC .................................................. 340/8.1, 10.1
See application file for complete search history.

(56) References Cited

U.S. PATENT DOCUMENTS

| | | | |
|---|---|---|---|
| 10,803,263 B2* | 10/2020 | Suzuki | G06K 19/0723 |
| 2006/0077039 A1 | 4/2006 | Ibi et al. | |
| 2008/0143482 A1* | 6/2008 | Shoarinejad | G01S 13/75 340/10.1 |
| 2008/0238685 A1* | 10/2008 | Tuttle | G01S 13/74 340/572.7 |
| 2009/0212921 A1* | 8/2009 | Wild | G08C 21/00 340/10.5 |
| 2010/0309017 A1* | 12/2010 | Ramchandran | G01S 3/74 340/8.1 |
| 2015/0302708 A1* | 10/2015 | Hattori | G06K 7/10009 705/16 |
| 2017/0286903 A1* | 10/2017 | Elizondo, II | H04B 17/318 |
| 2018/0003812 A1 | 1/2018 | Kamiya | |
| 2018/0053022 A1* | 2/2018 | Murofushi | G06K 7/10089 |
| 2018/0247092 A1* | 8/2018 | Khojastepour | G01S 11/06 |
| 2019/0102584 A1 | 4/2019 | Enomoto et al. | |
| 2020/0125808 A1 | 4/2020 | Yaginuma | |

* cited by examiner

*Primary Examiner* — Edwin C Holloway, III
(74) *Attorney, Agent, or Firm* — Kim & Stewart LLP

(57) ABSTRACT

According to an embodiment, a wireless tag reader apparatus includes a reader and a processor. The reader acquires the position information of the wireless tag based on the phase difference between the carrier waves and the response waves transmitted and received by the first antenna and the second antenna. The processor determines whether or not the wireless tag is in the predetermined zone based on the position information acquired by the reader.

10 Claims, 6 Drawing Sheets

US 11,301,647 B2

WIRELESS TAG READER APPARATUS AND WIRELESS TAG READING METHOD

CROSS-REFERENCE TO RELATED APPLICATIONS

This application is based upon and claims the benefit of priority from the prior Japanese Patent Application No. 2019-166853, filed on Sep. 13, 2019, the entire contents of which are incorporated herein by reference.

FIELD

The embodiment described herein generally relates to a wireless tag reader apparatus and a wireless tag reading method.

BACKGROUND

A wireless tag attached to an article, such as a commodity, is read by a wireless tag reader apparatus. In recent years, in many retail stores, electronic tags are attached to individual commodities to be handled, and the commodities are managed. In this case, the wireless tag reader apparatus needs to read only the wireless tag attached to the commodity to be purchased, which is in a basket or the like.

Conventionally, there has been proposed a system in which a wireless tag reader apparatus is provided with a shield that does not allow radio waves from an antenna of the wireless tag reader apparatus to flow out to the outside in order to read only a wireless tag that is within a predetermined zone, such as in a basket. There is also a method of detecting the relative positional relationship between the antenna of the wireless tag reader apparatus and the wireless tag by analyzing the phase of the radio wave transmitted and received by the wireless tag reader apparatus with the wireless tag. For example, a wireless tag reader apparatus may determine if the wireless tag is within a predetermined zone from a relative positional relationship. However, depending on the orientation of the antenna or the like, desired phase information for determining the relative positional relationship between the antenna and the wireless tag may not be acquired.

DETAILED DESCRIPTION

Figure 1:
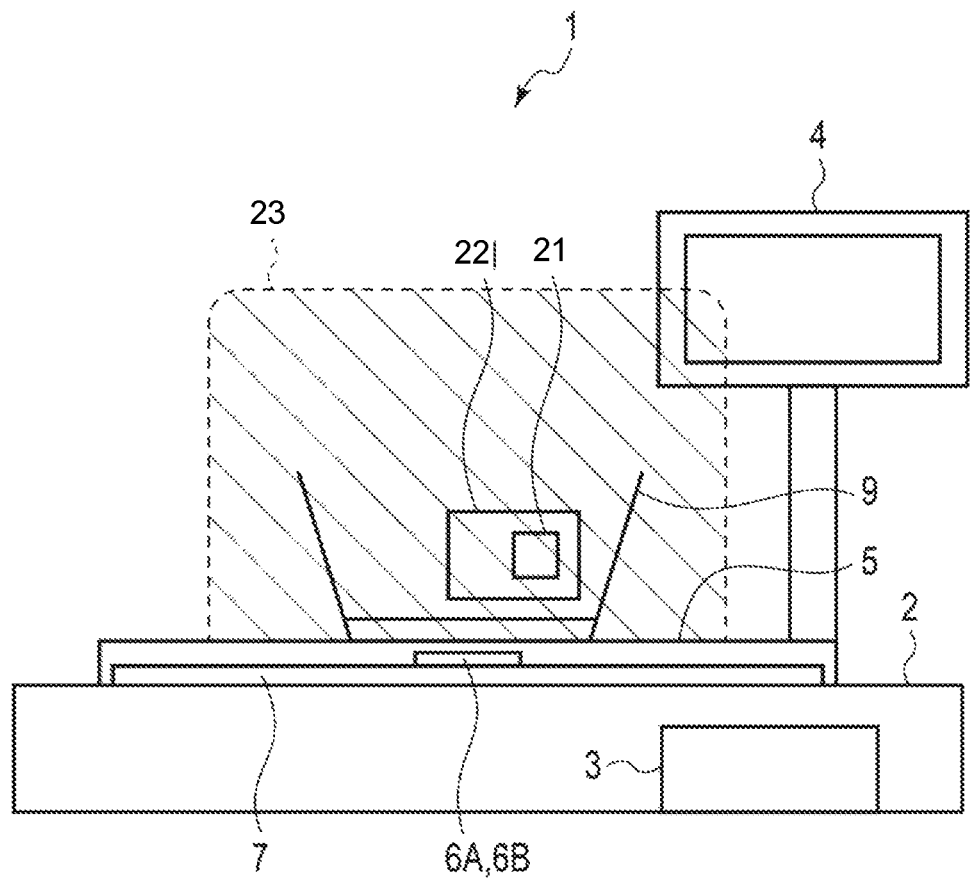
FIG. 1 is a diagram schematically showing a wireless tag reader apparatus according to an embodiment.

According to one embodiment, a wireless tag reader apparatus reads information from a wireless tag in a predetermined zone. The wireless tag reader apparatus includes a first antenna, a second antenna, a reader, a memory, and a processor. The first antenna is provided movably relative to a predetermined zone, transmits a carrier wave, and receives a response wave from the wireless tag. The second antenna is different from the first antenna. The second antenna is provided movably relative to the predetermined zone, transmits a carrier wave, and receives a response wave from the wireless tag. The reader acquires identification information of the wireless tag included in the response wave from the wireless tag received by the first antenna and the second antenna. The reader acquires position information of the wireless tag based on a phase difference between the carrier waves and the response waves transmitted and received by the first antenna and the second antenna. The memory stores information acquired by the reader. The processor determines whether or not the wireless tag is in the predetermined zone based on the position information acquired by the reader. Further, when determining that the wireless tag is in the predetermined zone, the processor stores the identification information of the wireless tag acquired by the reader in the memory.

Embodiments will be described below with reference to the drawings. The same reference symbols in the drawings will denote the same or similar portions. The wireless tag reader apparatus according to the embodiment wirelessly reads a wireless tag such as a RFID tag attached to an article or the like. The wireless tag reader apparatus is configured to read wireless tags in a predetermined zone. For example, a wireless tag reader apparatus reads a wireless tag attached to an article in a storage (hereinafter, referred to as a container) of an article, such as a shopping basket. The wireless tag reader apparatus may also read a wireless tag attached to an article in the container to pay for the article contained in the container.

FIG. 1 schematically shows a wireless tag reader apparatus 1 according to an embodiment. As shown in FIG. 1, the wireless tag reader apparatus 1 includes a housing 2, the controller 3, the input/output device 4, the table 5, the antenna 6A, the antenna 6B, and the conveying mechanism 7. The housing 2 is a frame that forms an outer shape of the wireless tag reader apparatus 1. The controller 3 controls the entire wireless tag reader apparatus 1. The controller 3 is connected to the input/output device 4, the table 5, the antenna 6A, the antenna 6B, the conveying mechanism 7, and the like. The controller 3 controls the operation of each part to read the wireless tag 21 attached to the article 22 in the predetermined zone 23. The configuration of the controller 3 will be described in detail later.

The input/output device 4 is provided on the housing 2. In FIG. 1, the input/output device 4 is provided on a support portion extending upward from the housing 2. The input/output device 4 is an interface that accepts input of instructions from an operator and displays various information to the operator. The input/output device 4 includes a user interface including an operating device for receiving input of instructions and a display device for displaying information.

As an operation of the operation device, the input/output device 4 transmits a signal indicating the operation content received from the operator to the controller 3. For example, an operation device as the input/output device 4 is a touch panel. The operation device may include hard keys such as a keyboard or a numeric keypad.

As an operation of the display device, the input/output device 4 displays an image based on the image data from the controller 3. For example, the display device as the input/output device 4 includes a display. The input/output device 4 may be one in which a display as a display device and a touch panel as an operation device are integrally formed.

On the table 5, the article 22 to which the wireless tag to be read is attached is placed. In FIG. 1, the predetermined zone 23, in which the wireless tag 21 attached to the article 22 to be read is disposed, is above the table 5. On the table 5, the article 22 to which the wireless tag to be read is attached may be placed directly, or the container 9 for containing the article 22 to which the wireless tag 21 is attached may be placed. However, it is assumed that one wireless tag 21 is attached to one article 22.

In the example shown in FIG. 1, the container 9 containing the article 22 to which the wireless tag 21 is attached is placed on the table 5. The container 9 is, for example, a shopping basket or a shopping bag. The container 9 may contain a plurality of articles 22. Also in this case, it is assumed that one wireless tag 21 is attached to each article 22. Therefore, the container 9 in which a plurality of wireless tags 21 are contained may be placed on the table 5. In this case, a plurality of wireless tags 21 exists in the predetermined zone 23 above the table 5.

The wireless tags 21 wirelessly transmit and receive data to and from the antennas 6 (6A and 6B). The wireless tag 21 returns, in response to a request from the controller 3, a response wave including identification information (e.g., EPC (Electronic Product Code)) identifying itself (wireless tag 2). Wireless tag 21 has a control unit and an antenna. The wireless tag 21 is, for example, a RFID tag. The wireless tag 21 receives the carrier wave from the antenna 6 (6A or 6B) and converts it into power. The wireless tag 21 is activated by the power acquired by converting the carrier wave. The activated wireless tag 21 transmits to the antenna 6 a response wave including its own identification information acquired by modulating the received carrier wave.

In FIG. 1, the antenna 6A, the antenna 6B, and the conveying mechanism 7 are installed below a mounting surface of the article on the table 5 on which the article 22 or the container 9 is placed. The antennas 6 (6A, 6B) are a plurality of antennas for the controller 3 to wirelessly communicate with the wireless tag 21. The antennas 6A and 6B transmit the carrier waves responsive by the wireless tag 21 to the predetermined zone 23 above the table 5 under control by the controller 3. The antennas 6A and 6B also receive a response wave from the wireless tag 21 relative to the transmitted carrier wave and convert it into an electric signal. The antennas 6A and 6B provide the converted electrical signals to the controller 3.

The antenna 6A and the antenna 6B differ from each other in at least one of the orientation to be arranged, the hardware configuration, the detection method, and the like. For example, the antenna 6A and the antenna 6B are circular polarized antennas, and are arranged to be in a different orientation with respect to the predetermined zone 23 above the table 5. Thus, the antenna 6A and the antenna 6B are provided in different orientations with respect to the wireless tags 21 attached to the articles 22 in the predetermined zone 23 above the table 5. One of the antennas 6A and 6B may receive a vertical polarized wave, and the other may receive a horizontal polarized wave. Here, the antennas 6A and 6B are assumed to be moved relative to the container 9 to be loaded on the table by the conveying mechanism 7, while being arranged in different orientations.

The conveying mechanism 7 moves the antenna 6A and the antenna 6B according to the control by the controller 3. The conveying mechanism 7 may be one that relatively moves the wireless tags 21 of the articles 22 on the table 5 or the articles 22 contained in the container 9 relative to the antenna 6A and the antenna 6B. For example, the conveying mechanism 7 may move the article 22 to which the wireless tag 21 is attached or the container 9 containing the article 22.

Figure 2:
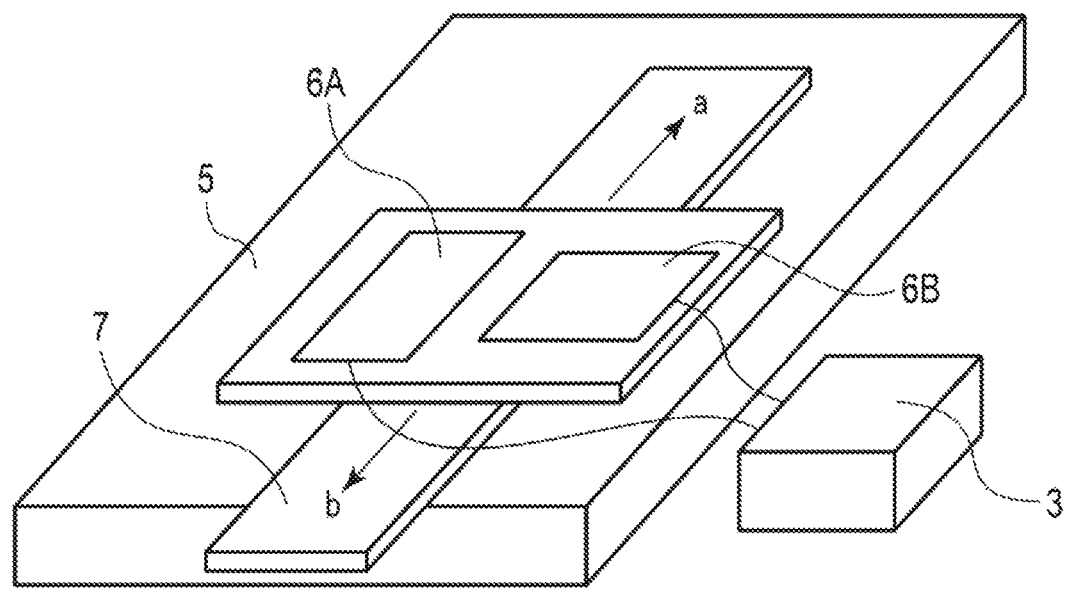
FIG. 2 is a diagram illustrating a configuration example of a plurality of antennas and a conveying mechanism in the wireless tag reader apparatus according to the embodiment.

FIG. 2 schematically shows the table 5, the antenna 6A, the antenna 6B, and the conveying mechanism 7 in the wireless tag reader apparatus 1. As shown in FIG. 2, the antenna 6A, the antenna 6B, and the conveying mechanism 7 are disposed below the predetermined zone (the zone in which the wireless tag 21 to be read is disposed) 23 above the table 5. The antenna 6A and antenna 6B are oriented differently relative to the predetermined zone 23 above the table 5. The antenna 6A and the antenna 6B, while being arranged in different orientations with respect to the predetermined zone 23 above the table 5, are moved in a predetermined direction ("a" or "b" direction) by the conveying mechanism 7.

The conveying mechanism 7 has a mechanism for moving the antenna 6A and the antenna 6B below the predetermined zone 23 above the table 5. For example, the conveying mechanism 7 includes a conveying belt for conveying the antenna 6A and the antenna 6B, a motor for driving the conveying belt, and the like. However, the configuration of the conveying mechanism 7 is not limited to a specific configuration.

Further, the antenna 6A, the antenna 6B, and the conveying mechanism 7 are connected to the controller 3. The carrier wave transmitted by each of the antenna 6A and the antenna 6B is controlled by the controller 3. Each of the antenna 6A and the antenna 6B receives a response wave that the wireless tag 21 responds to the transmitted carrier wave, and provides a signal acquired by converting the response wave into an electric signal to the controller 3. Further, the conveying mechanism 7 moves the antennas 6A and 6B in accordance with the control of the controller 3.

In FIG. 2, the conveying mechanism 7 moves the antennas 6A and 6B in the direction of the arrow "a" or the arrow "b". For example, the conveying mechanism 7 drives a conveying belt equipped with the antenna 6A and the antenna 6B by driving a motor in response to a control signal from the controller 3. For example, the controller 3, after moving the antenna 6A and the antenna 6B on the conveying belt by the conveying mechanism 7 in the arrow "a" direction (forward direction), moves the antenna 6A and the antenna 6B in the arrow "b" direction (return direction). Thus, the antenna 6A and the antenna 6B may read the wireless tag 21 present in the predetermined zone 23 while moving (reciprocating) in two directions with respect to the predetermined zone 23.

Figure 3:
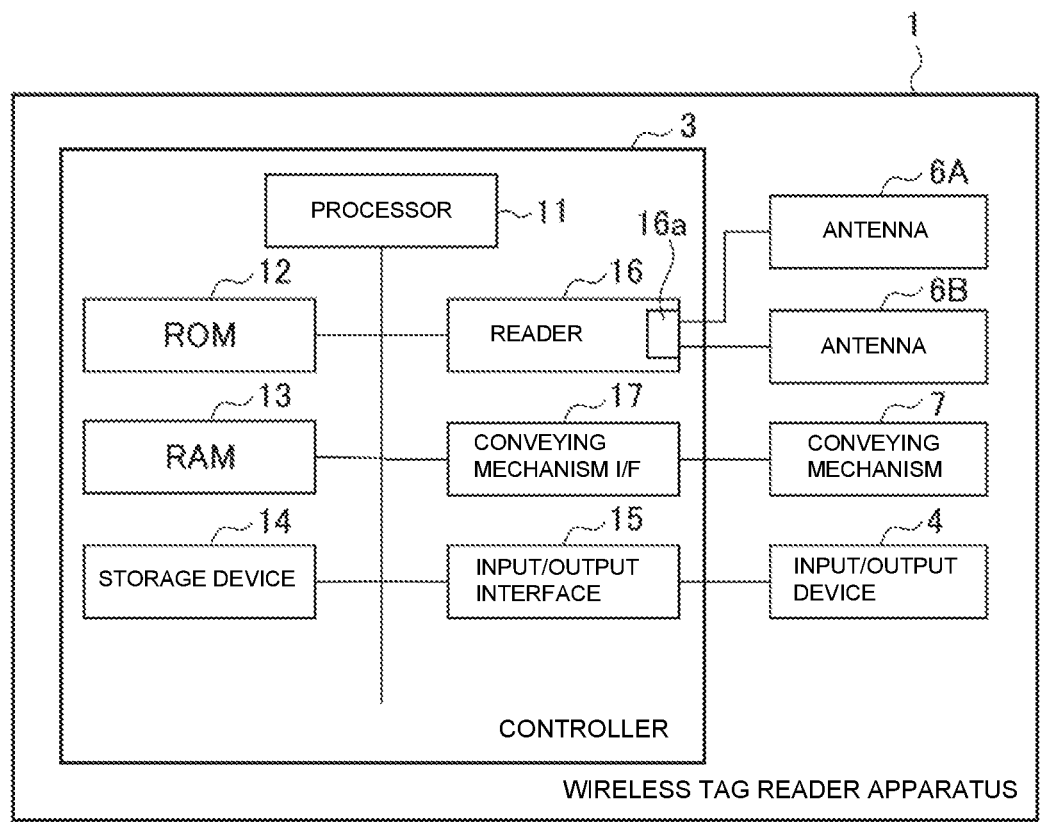
FIG. 3 is a block diagram showing the wireless tag reader apparatus according to the embodiment.

Next, a configuration example of a control system in the wireless tag reader apparatus 1 according to the embodiment will be described. FIG. 3 shows an example of a configuration of a control system in the wireless tag reader apparatus 1. The wireless tag reader apparatus 1 includes, as shown in FIG. 3, the controller 3, the input/output device 4, the antenna 6A, the antenna 6B, and the conveying mechanism 7. In the wireless tag reader apparatus 1, the controller 3 is connected with the input/output device 4, the antennas 6A and 6B, and the conveying mechanism 7. The controller 3 controls the operation of each part. Incidentally, the input/output device 4, the antennas 6A and 6B, and the conveying mechanism 7 as peripheral devices may be connected to the controller 3.

The controller 3 includes the processor 11, the ROM 12, the RAM 13, the storage device 14, the input/output interface 15, the reader 16, and the conveying mechanism interface 17, as illustrated in FIG. 3. Incidentally, the wireless tag reader apparatus 1 may have components as required in addition to the components shown in FIG. 3, or specific components may be excluded from the components shown in FIG. 3.

The processor 11 is connected to the ROM 12, the RAM 13, the storage device 14, the input/output interface 15, the reader 16, and the conveying mechanism interface 17. The input/output interface 15 is connected to the input/output device 4. The conveying mechanism interface 17 is connected to the conveying mechanism 7. The conveying mechanism 7 is connected to the processor 11 via the conveying mechanism interface 17. The conveying mechanism 7 moves the antennas 6A and 6B as described above in response to a control instruction from the processor 11.

The reader 16 is connected to the antenna 6A and the antenna 6B. The reader 16 has the switching device 16a. The switching device 16a includes a circuitry for switching the antenna 6A and the antenna 6B as an antenna for transmitting and receiving radio waves (wireless communication activated antenna). The switching device 16a switches the antenna 6A or the antenna 6B, in response to a control instruction from the processor 11, such that either the antenna 6A or the antenna 6B transmits and receives radio waves. For example, the reader 16 switches the antenna to be activated according to the moving direction of the antenna 6A and the antenna 6B by the conveying mechanism 7. Further, the reader 16 may switch between the antenna 6A and the antenna 6B at a predetermined period, as the antenna for transmitting and receiving radio waves is switched at a predetermined period.

The processor 11 controls the overall operation of the wireless tag reader apparatus 1. The processor 11 may include an internal cache, various interfaces, and the like. The processor 11 implements various functions by executing a program stored in advance in an internal memory, the ROM 12, or the storage device 14. Part of the various functions realized by the processor 11 executing the program may be realized by a hardware circuitry. In this case, the processor 11 controls the functions performed by the hardware circuitry.

The ROM 12 is a nonvolatile memory in which control programs, control data, and the like are stored in advance. The control program and the control data stored in the ROM 12 are incorporated in advance according to the specifications of the wireless tag reader apparatus 1. The ROM 12 stores, for example, programs for controlling the circuitry board of the RFID reader 1.

The RAM 13 is a volatile memory. The RAM 13 temporarily stores the data being processed by the processor 11. The RAM 13 stores various application programs based on instructions from the processor 11. The RAM 13 may also store data required for executing the application program, execution results of the application program, and the like.

The storage device 14 (storage unit) is a nonvolatile memory capable of writing and rewriting data. The storage device 14 may include, for example, an HDD (Hard Disk Drive), an SSD (Solid State Drive), or a flash memory. The storage device 14 stores a control program, an application, various data, and the like depending on the operation application of the wireless tag reader apparatus 1.

The input/output interface 15 is an interface for transmitting and receiving data to and from the input/output device 4. For example, the input/output interface 15 receives a signal indicating an operation received from the user from the input/output device 4. The input/output interface 15 transmits the received signal to the processor 11. The input/output interface 15 transmits information indicating a screen to be displayed for the user to the input/output device 4 under the control of the processor 11. For example, the input/output interface 15 may support a USB connection or may support a parallel interface connection.

The reader 16 performs wireless communication with the wireless tags 21 through the antenna 6A or the antenna 6B under the control of the processor 11. For example, the reader 16 emits an unmodulated wave as a carrier wave through the antenna 6A or 6B. The reader 16 receives and demodulates a response wave to the carrier wave from the wireless tag 21 through the antenna 6A or 6B. The reader 16 acquires data such as identification information from the wireless tag 21 by demodulating the response wave. The reader 16 transmits the acquired data to the processor 11. For example, the reader 16 acquires the identification information included in the response wave from the wireless tag 21 and transmits the identification information to the processor 11.

The reader 16 also analyzes the phase of the radio waves transmitted and received to and from the wireless tags by the antenna 6A or the antenna 6B activated by the switching device 16a. The reader 16 acquires the phase difference between the carrier wave transmitted by the antenna 6A or the antenna 6B to the wireless tag and the response wave received from the wireless tag. The reader 16 transmits information indicating the measured phase difference to the processor 11.

Here, the reader 16 transmits and receives data to and from the wireless tag 21 existing in the predetermined zone 23 above the table 5. That is, the reader 16 activates either the antenna 6A or the antenna 6B by the switching device 16a. The reader 16 radiates the carrier wave from the antenna 6A or the antenna 6B activated by the switching device 16a at a power that may be transmitted to the wireless tag 21 present in the predetermined zone 23. The reader 16 also receives, through the activated antenna 6A or the antenna 6B, a response wave from the wireless tag 21 in response to the emitted carrier wave.

The conveying mechanism interface 17 is an interface for transmitting and receiving data to and from the conveying mechanism 7. The conveying mechanism interface 17 transmits a signal for driving the conveying mechanism 7 to the conveying mechanism 7 under the control of the processor 11. For example, the conveying mechanism interface 17 sends a signal to the conveying mechanism 7 instructing convey or stop. The conveying mechanism interface 17 may also provide power to the conveying mechanism 7. For example, the conveying mechanism interface 17 may support a USB connection or a parallel interface connection.

Next, a method of detecting that the wireless tag is in the predetermined zone 23 based on the phase difference between the carrier wave and the response wave will be described. Generally, as the relative distance between the antenna and the wireless tag increases, the phase difference decreases. Conversely, as the relative distance between the antenna and the wireless tag decreases, the phase difference increases. That is, the relative distance between the antenna and the wireless tag may be estimated based on the phase difference between the carrier wave emitted from the antenna and the response wave from the wireless tag relative to the carrier wave. If the position of the antenna may be specified, the position of the wireless tag may be estimated based on the phase difference. Thus, if the variation in the phase difference according to the change in the relative distance between the antenna and the wireless tag may be reliably acquired, the wireless tag reader apparatus 1 may specify whether or not the wireless tag is in the predetermined zone 23.

However, in practice, there is a case that the change of the phase difference in accordance with the variation of the relative distance between the antenna and the wireless tag may not be acquired. In such a case, by changing the orientation of the antenna with respect to the wireless tag, it may be possible to acquire a change in the phase difference corresponding to the variation of the relative distance between the antenna and the wireless tag.

Figure 4:
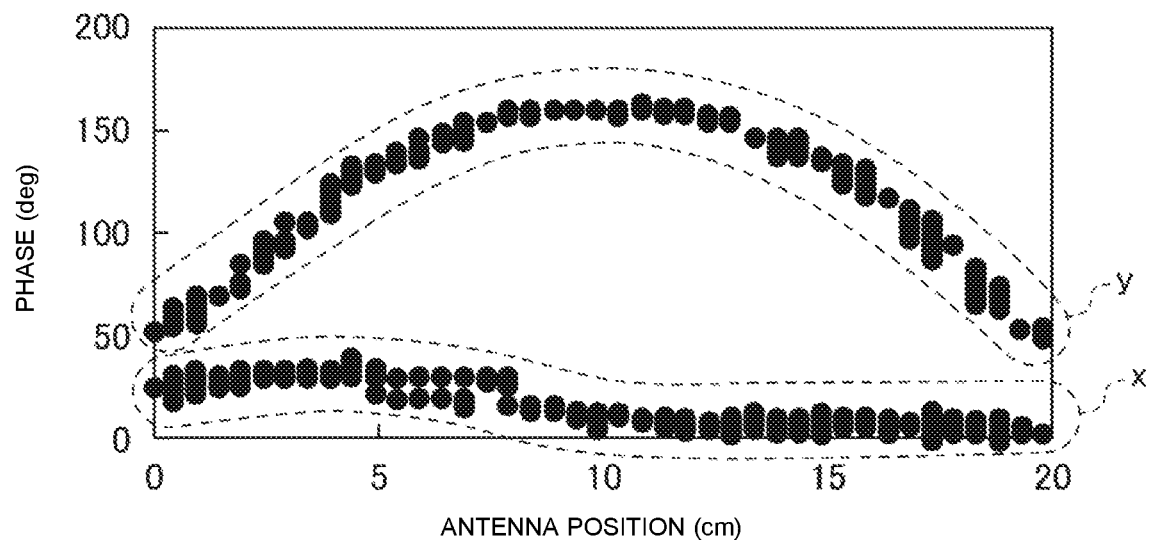
FIG. 4 is a graph showing an example of a phase difference with the wireless tag according to the orientation of the antenna of the wireless tag reader apparatus according to the embodiment.

FIG. 4 is a graph showing an example of the relationship between the antenna position and the phase when changing the direction of the wireless tag. FIG. 4 shows a measurement result y in which the phase is detected with the wireless tag in the first orientation, and a measurement result x in which the phase is detected with the wireless tag in a second orientation different from the first orientation. However, the antenna is acquired by using an antenna of circular polarized waves.

As shown in FIG. 4, even the same antenna, the variation width of the phase value may be reduced by the orientation of the wireless tag. If the variation width of the phase value is a level that may not be detected as a variation in the relative position between the antenna and the wireless tag, it becomes difficult to identify the position of the wireless tag by the phase difference. For example, it is difficult to specify the position of the wireless tag from the measurement result x shown in FIG. 4. However, when the orientation of the wireless tag is changed as in the measurement result y shown in FIG. 4, a change range of the phase value is acquired so that the position of the wireless tag may be specified. According to the measurement result y shown in FIG. 4, it is possible to estimate the relative distance of the wireless tag to the antenna, and it is possible to identify the position of the wireless tag.

To cope with such phenomena, the wireless tag reader apparatus 1 according to the embodiment has a first antenna (antenna 6A) and a second antenna different from the first antenna (antenna 6B). For example, the first antenna 6A and the second antenna 6B are arranged in which the orientations differ with respect to the predetermined zone 23. The wireless tag reader apparatus 1 acquires the position information, the moving direction of the antenna, and the phase information for each antenna by linking them. The wireless tag reader apparatus 1 executes reading of the wireless tag at each of the first antenna 6A that moves in the first direction and the second antenna 6B that moves in the second direction. The wireless tag reader apparatus 1 determines whether or not the wireless tag is within the predetermined zone 23 based on the read result of the wireless tag using the first antenna 6A and the read result of the wireless tag using the second antenna 6B.

Figure 5:
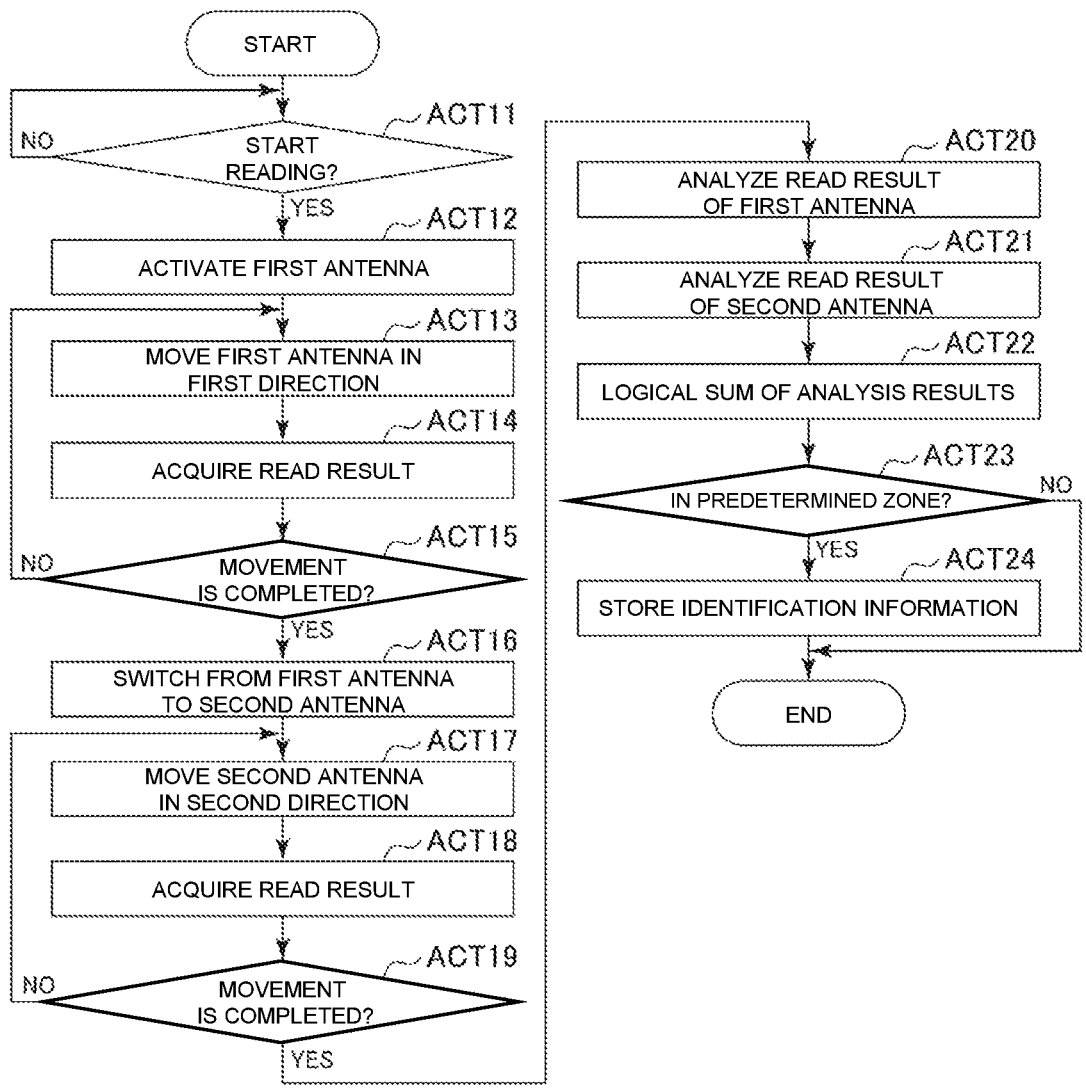
FIG. 5 is a flowchart illustrating an operation example of the wireless tag reader apparatus according to the embodiment.

Next, an operation example of the wireless tag reader apparatus 1 according to the embodiment will be described. FIG. 5 shows an example of operation of the wireless tag reader apparatus 1 according to the embodiment. In ACT11 of FIG. 5, the processor 11 of the controller 3 of the wireless tag reader apparatus 1 determines whether to start reading the wireless tag 21 present in the predetermined zone 23.

For example, the operator places the container 9 containing the article 22 to which the wireless tag 21 is attached on the table 5, and instructs the start of reading by the input/output device 4. The processor 11 of the controller 3 starts reading the wireless tag 21 attached to the article 22 in response to an instruction to start reading input to the input/output device 4. Further, the processor 11 of the controller 3 may start reading the wireless tag 21 attached to the article 22 by detecting that the article 22 or the container 9 is placed on the table 5. If it is determined that reading of the wireless tag 21 is not started (ACT11, NO), the processor 11 returns to the process of ACT11 and waits for reading to start.

When the processor 11 determines that reading of the wireless tag 21 has started (ACT11, YES), the process of the processor 11 proceeds to ACT12. In ACT12, the processor 11 selects and activates one of a plurality of antennas as an antenna for performing wireless communication. Here, it is assumed that the processor 11 selects the first antenna 6A as the antenna to be activated. In this instance, the processor 11 instructs the reader 16 to set the antenna to be activated, i.e., the antenna for executing wireless communication, as the first antenna 6A. The reader 16, in response to an instruction from the processor 11, as the antenna for transmitting and receiving radio waves, sets the first antenna 6A by the switching device 16a.

The processor 11, when setting the antenna for transmitting and receiving radio waves to the first antenna 6A, in ACT13, starts moving the antenna 6A in the first direction by the conveying mechanism 7. For example, the processor 11 moves the first antenna 6A in, as a first direction, the "a" direction (forward direction) shown in FIG. 2.

In ACT14, the processor 11 performs wireless communication with the wireless tag using the first antenna 6A while moving the first antenna 6A in the first direction. In response to an instruction from the processor 11, the reader outputs a carrier wave using the first antenna 6A and receives a response wave from the wireless tag in response to the carrier wave.

The processor 11 acquires the read result of the wireless tag using the first antenna 6A that moves in the first direction through the reader 16. For example, the reader 16 acquires the identification information of the wireless tag included in the response wave from the wireless tag 21 received by the first antenna 6A. Further, the reader 16 acquires a phase difference between the carrier wave that the first antenna 6A transmits while moving in the first direction and the response wave that the first antenna 6A receives. Furthermore, the reader 16 acquires position information indicating the position of the wireless tag which is estimated from the temporal change of the phase difference due to the movement of the first antenna 6A. The position information includes information indicating whether or not the wireless tag is within the predetermined zone 23. The information acquired by the reader 16 using the first antenna 6A is stored in a memory, such as the RAM 13 or the storage device 14, as a first reading result.

Next, in ACT15, the processor 11 determines whether the movement of the first antenna 6A in the first direction is completed. The processor 11 repeatedly executes the process of ACT13 to ACT14 until the movement of the first antenna 6A in the first direction is completed (ACT15, NO). Thus, information indicating the read result (the first read result) acquired by reading the wireless tag is accumulated in the memory such as the RAM 13 or the storage device 14 while the first antenna 6A moves in the first direction.

When the processor 11 determines that the movement of the first antenna 6A in the first direction is completed (ACT15, YES), the process of the processor 11 proceeds to ACT16. In ACT16, the processor 11 switches the antenna for performing wireless communication (transmission and reception of radio waves) from the first antenna 6A to the second antenna. Here, it is assumed that the processor 11 selects the antenna 6B as the second antenna. In this instance, the processor 11 instructs the reader 16 to set the second antenna for performing wireless communication as the antenna 6B. The reader 16, in response to an instruction from the processor 11, sets the antenna for transmitting and receiving radio waves to the second antenna 6B by the switching device 16a.

The processor 11, when setting the antenna for transmitting and receiving radio waves to the second antenna 6B, in ACT17, starts moving in the second direction of the second antenna 6B by the conveying mechanism 7. For example, the processor 11 moves the second antenna 6B in the "b" direction (return direction) shown in FIG. 2 as the second direction.

In ACT18, the processor 11 performs wireless communication with the wireless tags using the second antenna 6B while moving the second antenna 6B in the second direction. In response to an instruction from the processor 11, the reader 16 transmits a carrier wave using the second antenna 6B and receives a response wave from the wireless tag relative to the carrier wave.

The processor 11 acquires the read result of the wireless tag using the second antenna 6B moving in the second direction through the reader 16. For example, the reader 16 acquires the identification information of the wireless tag included in the response wave from the wireless tag 21 received by the second antenna 6B. Further, the reader 16 acquire a phase difference between the carrier wave that the second antenna 6B transmits while moving in the second direction and the response wave that the second antenna 6B receives. Furthermore, the reader 16 acquires position information indicating the position of the wireless tag which is estimated from the temporal change of the phase difference due to the movement of the second antenna 6B. The position information includes information indicating whether or not the wireless tag is within the predetermined zone 23. The information acquired by these readers 16 using the second antennas is stored in a memory, such as the RAM 13 or the storage device 14, as a second reading result.

Next, in ACT19, the processor 11 determines whether the movement of the second antenna 6B in the second direction is completed. The processor 11 repeatedly executes the process of ACT17 and ACT18 until the movement of the second antenna 6B in the second direction is completed (ACT19, NO). Accordingly, information indicating the read result (the second read result) acquired by reading the wireless tag while the second antenna 6B moves in the second direction is accumulated in the memory such as the RAM 13 or the storage device 14.

When the processor 11 determines that the second direction of movement of the second antenna 6B has been completed (ACT19, YES), in ACT20 to ACT24, the processor 11 performs the process of detecting the wireless tag in the predetermined zone 23. The processor 11 analyzes the first read result and the second read result, and executes a process of making the identification information of the wireless tag determined to be in the predetermined zone 23 as the final read result.

That is, in ACT20, the processor 11 analyzes the first read result of the wireless tag using the first antenna 6A moving in the first direction. The processor 11 determines whether or not each wireless tag is in the predetermined zone 23 based on the identification information of each wireless tag included in the first reading result and the phase difference of the transmitted and received radio waves. For example, the processor 11 detects that a wireless tag is in the predetermined zone 23, indicating the temporal change of the phase difference, from the first reading result using the first antenna 6A moving in the first direction.

Next, in ACT21, the processor 11 analyzes the second read result of the wireless tag using the second antenna 6B moving in the second direction. The processor 11 determines whether or not each wireless tag is in the predetermined zone 23 based on the identification information of each wireless tag included in the second reading result and the phase difference of the transmitted and received radio waves. For example, the processor 11 detects a wireless tag in the predetermined zone 23 from the second reading result using the second antenna 6B moving in the second direction, indicating the temporal change of the phase difference.

In ACT22, the processor 11 specifies the wireless tags in the predetermined zone 23 by the analysis result (the first analysis result) for the first read result and the analysis result (the second analysis result) for the second read result. For example, the processor 11 identifies the wireless tag in the predetermined zone 23 by the logical sum of the first analysis result and the second analysis result. The processor 11 identifies the wireless tag determined to be within the predetermined zone 23 as the wireless tag in the predetermined zone 23 based on either the first analysis result or the second analysis result, or both. That is, even if the wireless tag is not determined to be within the predetermined zone 23 in the first reading result, if it is determined to be within the predetermined zone 23 in the second reading result, the wireless tag is specified to be within the predetermined zone 23. In other words, even a wireless tag that may not be detected as a read target in wireless communication using the first antenna 6A may be detected as a read target in wireless notification using the second antenna 6B.

The processor 11 then determines whether the wireless tags within the predetermined zone 23 have been identified. When the wireless tag in the predetermined zone 23 may not be specified (ACT23, NO), the processor 11 determines that the wireless tag is not present in the predetermined zone 23, and ends the reading process shown in FIG. 5. In this case, the processor 11 may display on the input/output device 4 that there is no readable wireless tag in the predetermined zone 23.

When the processor 11 determines that the wireless tag in the predetermined zone 23 has been identified (ACT23, YES), the process of the processor 11 proceeds to ACT24. In ACT24, the processor 11 stores the identification information of the wireless tag 21 identified as being in the predetermined zone 23 in the memory (RAM 13 or the storage device 14) as a result of reading the wireless tag in the predetermined zone 23. In this case, the processor 11 may display, on the input/output device 4, the identification information of the wireless tag 21 identified to be within the predetermined zone 23 or the article (commodity) information identified from the identification information.

In the operation example of the above-described embodiment, it is assumed that the first read result by the first antenna 6A moved in the first direction and the second read result by the second antenna 6B moved in the second direction are acquired. Not limited thereto, the moving direction of the first antenna 6A and the second antenna 6B may be one direction. For example, the first antenna 6A and the second antenna 6B to be moved in one direction may be switched at predetermined timings to acquire the first reading result and the second reading result.

However, the data including the phase difference between the carrier wave and the response wave corresponding to the carrier wave, which is acquired as the reading result, is collected in a predetermined sampling. Therefore, when acquiring data by switching the two antennas to be moved in one direction, if the movable distance is constant, the amount of sampling for each antenna is reduced. Reducing the amount of data as the first and second read results may improve the processing speed of data analysis while reducing the detection accuracy of wireless tags. Conversely, according to the reading results of the first antenna 6A moved in the first direction and the second antenna 6B moved in the second direction, it is easy to collect enough sampling amount as data to be analyzed. As a result, there is a possibility that the wireless tag in the predetermined zone 23 may be specified with high accuracy.

Further, in the above-described embodiment, the wireless tag reader apparatus 1 is assumed to have two antennas of the first antenna 6A and the second antenna 6B physically independent. However, the first antenna 6A and the second antenna 6B may be any antennas having different properties with respect to the wireless tag in the predetermined zone 23. For example, by switching one antenna to two different properties, it may be used as the first antenna 6A and the second antenna 6B.

Figure 6:
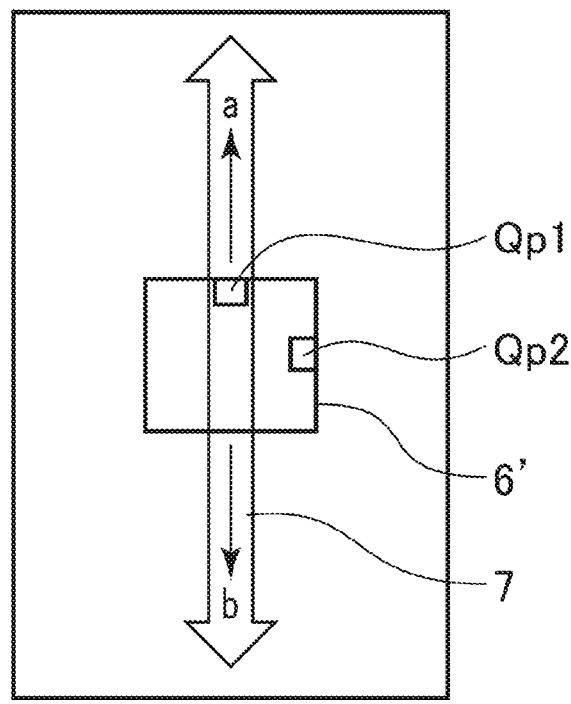
FIG. 6 is a diagram illustrating another example of an antenna in the wireless tag reader apparatus according to the embodiment.

FIG. 6 shows the antenna 6' capable of switching the feeding point as a modified example of the antennas 6 (6A, 6B) in the wireless tag reader apparatus 1. As shown in FIG. 6, the antenna 6' has two feed points Qp1 and Qp2. The orientation of the antenna 6' is mechanically changed, by switching the feeding point. The antenna 6' is assumed to move in the first direction and the second direction by the conveying mechanism 7 in accordance with the control of the controller 3, similar to the antennas 6 shown in FIGS. 1 and 2.

Further, the feeding point of the antenna 6' is assumed to be switched to either the feeding point Qp1 or the feeding point Qp2 by the switching device 16a of the reader 16. Thus, the antenna 6', in accordance with the control of the controller 3, is switched to one of the antenna and the feeding point Qp2 of the antenna of the feeding point Qp1. For example, the antenna 6' may function as a first antenna, when moving in the first direction (e.g., the forward direction indicated by arrow "a"), where the feeding point is set to the feeding point Qp1. Further, the antenna 6' may function as a second antenna, when moving in the second direction (e.g., the return direction indicated by arrow "b"), where the feeding point is set to the feeding point Qp2.

As described above, the wireless tag reader apparatus according to the embodiment includes a first antenna, a second antenna having a different arrangement direction from the first antenna, and a processor. The processor acquires the first analysis result of detecting the wireless tag in the predetermined zone from the phase difference of the radio waves transmitted and received through the first antenna moving in the first direction. The processor acquires a second analysis result acquired by detecting the wireless tag in the predetermined zone from the phase difference of the radio wave transmitted and received via the second antenna moving in the second direction. The processor identifies the wireless tag in the predetermined zone by the logical sum of the first analysis result and the second analysis result. The processor acquires the identification information of the wireless tag identified as being in the predetermined zone as a read result. As a result, the wireless tag reader apparatus according to the above-described embodiment may reliably read the wireless tag attached to the article in the predetermined zone.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the spirit of the inventions. The accompanying claims and their equivalents are intended to cover such forms or modifications as would fall within the scope and spirit of the inventions.

What is claimed is:

1. A wireless tag reader apparatus configured to read information from a wireless tag in a predetermined zone, comprising:
    a first antenna that is movable relative to the predetermined zone;
    a second antenna that is movable relative to the predetermined zone, an orientation of the second antenna relative to the predetermined zone being different from an orientation of the first antenna relative to the predetermined zone;
    a switching device configured to activate the first antenna to transmit first carrier waves to the wireless tag and to receive first response waves from the wireless tag and, thereafter, to activate the second antenna to transmit second carrier waves to the wireless tag and to receive second response waves from the wireless tag;
    a conveying mechanism configured to move the activated first antenna relative to the predetermined zone such that the first antenna transmits the first carrier waves from a first set of different locations, and to move the activated second antenna relative to the predetermined zone such that the second antenna transmits the second carrier waves from a second set of different locations;
    a reader configured to acquire identification information of the wireless tag included in the first and second response waves from the wireless tag received by the first antenna at the first set of different locations and the second antenna at the second set of different locations, and to acquire position information of the wireless tag based on phase differences between the first carrier waves and the first response waves and phase differences between the second carrier waves and the second response waves;
    a memory; and
    a processor that is configured to:
        determine whether or not the wireless tag is in the predetermined zone based on the position information acquired by the reader, and
        upon determining that the wireless tag is in the predetermined zone, store the identification information of the wireless tag acquired by the reader in the memory.

2. The wireless tag reader apparatus according to claim 1, wherein the position information indicates a position of the wireless tag, the position of the wireless tag being estimated from temporal changes of the phase differences due to the movement of the first antenna and the movement of the second antenna.

3. The wireless tag reader apparatus according to claim 1, wherein the processor is further configured to instruct the conveying mechanism to move the first antenna and the second antenna.

4. The wireless tag reader apparatus according to claim 3, wherein
    the position information includes
        first position information indicating a first position of the wireless tag, the first position of the wireless tag being estimated from a temporal change of the phase differences between the first carrier waves and the first response waves, and
        second position information indicating a second position of the wireless tag, the second position of the wireless tag being estimated from a temporal change of the phase differences between the second carrier waves and the second response waves.

5. The wireless tag reader apparatus according to claim 4, wherein the processor is further configured to determine whether or not the wireless tag is in the predetermined zone based on the first position information and the second position information.

6. The wireless tag reader apparatus according to claim 1, further comprising:
a display device, wherein
the processor upon determining that the wireless tag is in the predetermined zone, is further configured to cause the display device to display the identification information of the wireless tag.

7. The wireless tag reader apparatus according to claim 1, wherein the conveying mechanism is further configured to move the first antenna and the second antenna in different directions from each other relative to the predetermined zone.

8. The wireless tag reader apparatus according to claim 1, wherein the conveying mechanism is further configured to move the first antenna in a direction opposite to that of the second antenna relative to the predetermined zone.

9. The wireless tag reader apparatus according to claim 3, wherein
the processor is further configured to determine that the wireless tag is in the predetermined zone if either first position information estimated from a temporal change of the phase differences between the first carrier waves and the first response waves or second position information estimated from a temporal change of the phase differences between the second carrier waves and the second response waves indicates that the wireless tag is in the predetermined zone.

10. A wireless tag reading method executable by a wireless tag reader apparatus configured to read information from a wireless tag in a predetermined zone, comprising:
moving a first antenna relative to the predetermined zone;
acquiring first position information indicating a first position of the wireless tag based on a temporal change of phase differences between first carrier waves transmitted by the first antenna from a first set of different locations and first response waves received from the wireless tag;
moving a second antenna relative to the predetermined zone after the moving of the first antenna is completed, an orientation of the second antenna relative to the predetermined zone being different from an orientation of the first antenna relative to the predetermined zone;
acquiring second position information indicating a second position of the wireless tag based on a temporal change of phase differences between second carrier waves transmitted by the second antenna from a second set of different locations and second response waves received from the wireless tag;
determining whether or not the wireless tag is in the predetermined zone based on at least one of the acquired first position information and the acquired second position information; and
upon determining that the wireless tag is in the predetermined zone based on the at least one of the acquired first position information and the acquired second position information, storing identification information of the wireless tag included in the first response waves from the wireless tag received by the first antenna or the second response waves from the wireless tag received by the second antenna in a memory.

* * * * *